United States Patent [19]
Li et al.

[11] Patent Number: 5,179,664
[45] Date of Patent: Jan. 12, 1993

[54] SYMBOL-WIDE ELASTICITY BUFFER WITH A READ-ONLY SECTION AND A READ-WRITE SECTION

[75] Inventors: Gabriel M. Li, San Francisco, Calif.; James R. Hamstra, Shorewood, Minn.

[73] Assignee: National Semiconductor, Santa Clara, Calif.

[21] Appl. No.: 338,587

[22] Filed: Apr. 14, 1989

[51] Int. Cl.$^5$ .................... H04L 1/00; G08C 25/00
[52] U.S. Cl. ................ 395/250; 364/239.3; 364/239.7; 364/260.1; 364/939.3
[58] Field of Search ............... 364/200, 900; 395/250

[56] References Cited

U.S. PATENT DOCUMENTS

| | | | |
|---|---|---|---|
| 4,688,210 | 8/1987 | Eizenhöfer et al. | 370/18 |
| 4,703,486 | 10/1987 | Bemis | 371/41 |
| 4,797,951 | 1/1989 | Duxbury et al. | 455/608 |
| 4,945,548 | 7/1990 | Iannarone et al. | 375/4 |
| 4,979,167 | 12/1990 | McCool | 370/85.4 |
| 4,984,251 | 1/1991 | Perloff et al. | 375/38 |
| 5,043,981 | 8/1991 | Firoozmand et al. | 370/85.1 |
| 5,046,182 | 9/1991 | Hamstra et al. | 370/79 |

FOREIGN PATENT DOCUMENTS 0188111  7/1986  European Pat. Off.

OTHER PUBLICATIONS

Thirty Second IEEE Computer Society International Conference; SF, Calif. Feb. 23rd-27th 1987, pp. 434-440, IEEE, New York, US: F. E. Ross, "FDDI—an Overview" p. 436 right-hand column, lines 17-38.
Research Disclosure; No. 285, Jan., 1988, p. 57, disclosure No. 28581, NY, US; "Data communication jitter remover" p. 57 left hand column, lines 9-18.

Primary Examiner—Dale M. Shaw
Assistant Examiner—Robert S. Hauser
Attorney, Agent, or Firm—Limbach & Limbach

[57] ABSTRACT

A symbol-wide elasticity buffer for a receive/transmit station within an asynchronous data transmission network provides both for reframing after each packet and for the handling of a continuous line state symbol for a period longer than the allowed packet size. According to one aspect of the invention, the elasticity buffer is divided into a START section and a CONTINUATION section. The buffer's write pointer will not enter the CONTINUATION section until the read pointer is directed to the first of the multiple, sequential registers comprising the START section. The read pointer must sequentially read the START section registers before entering the CONTINUATION section. Once the write pointer or read pointer leaves the START section, it can only reenter the START section upon receipt of a start delimiter signal. When the write pointer or the read pointer reaches the last register in the CONTINUATION section, it is automatically routed back to the first CONTINUATION section register. According to a second aspect of the invention, a repeat flag is associated with the last register in the CONTINUATION section. The repeat flag is set upon receipt of any repeatable control signal. With the Repeat Flag set, the read pointer will reach the final CONTINUATION section register and continue to read the same symbol without causing an overflow or underflow. When a new symbol is received, a CONTINUE signal is generated and the write pointer begins writing to the CONTINUATION section. After a predetermined delay, the read pointer begins reading the first register in the CONTINUATION section and the R-Flag is cleared.

21 Claims, 8 Drawing Sheets

SYMBOL-WIDE ELASTICITY BUFFER WITH A READ-ONLY SECTION AND A READ-WRITE SECTION

COPYRIGHT NOTICE

A portion of the disclosure of this patent document, specifically the internal symbol codes set forth in the Appendix, contains unpublished material which is subject to copyright protection. The copyright owner, National Semiconductor Corporation, has no objection to the facsimile reproduction by anyone of the patent document or the patent disclosure, as it appears in the Patent and Trademark Office patent file or records, but otherwise reserves all rights.

BACKGROUND OF THE INVENTION

1. Field of the Invention

The present invention relates to digital data communications systems and, in particular, to an elasticity buffer that accommodates frequency differences between the receive clock and the local transmit clock in a data terminal while permitting timing drift between terminal clocks and maintaining constant timing between data packets.

2. Discussion of the Prior Art

In an "asynchronous" data communications system, each data terminal within the system receives incoming data from a transmitting station based upon a "receive" clock which is recovered from the incoming signal. However, the receiving terminal relies upon an asynchronous "local" clock to retransmit the data recovered from the incoming signal. Network synchronization is maintained by utilizing an elasticity buffer to compensate for the phase and frequency differences between the recovered receive clock and the local transmit clock.

Asynchronous data terminals transmit a contiguous series, or packet, of data characters which are separated by start-stop code patterns. The use of a unique start code ("start delimiter") and a unique stop code ("end delimiter") allows a receiving terminal to identify the exact beginning and the exact end of each received data packet.

When data signals are being transmitted from one data terminal to another, the recovery timing of the receiving terminal must be the same as or very close to the transmission timing of the transmitting terminal in order to achieve reliable data packet propagation. If there is a timing difference between the transmitting terminal and the receiving terminal, then receiver data sampling will drift, causing eventual data sampling error at the limits of the data packets and, hence, system malfunctioning.

In addition, metastability problems can be created by the phase differential between a data terminal's recovered write (receive) clock and local read (transmit) clock. If the read and write clock speeds are high in comparison to the intrinsic speed of the terminal's logic circuits, then a metastable state between logic "1" and "0" can persist and be propagated to the transmitted data. An obvious solution to this problem is to build faster logic. Another solution is to create a chain of latches to allow the metastability to settle out; this solution, however, introduces undesirable delay into the system.

The Fiber Distributed Data Interface (FDDI) protocol is an ANSI (American National Standards Institute) data transmission standard which applies to a 100 MBit per second token ring network that utilizes an optical fiber transmission medium. The FDDI protocol is intended as a high performance interconnection among mainframe computers as well as among mainframes and their associated mass storage subsystems and other peripheral equipment.

To reduce jitter in any data signal in a transmission ring, each terminal on the ring must transmit with its own local clock ("jitter" is the short term variation of the transition edges of a digital signal from their ideal positions). According to the FDDI protocol, this local clock is allowed to have a maximum frequency variation of only ±50 PPM from the transmit clock frequency of other data terminals in the system at a transmission rate of 125 Mbits per second. Because the transmitted data are encoded according to a 4B/5B scheme, that is, 4 bits of data are encoded to create a 5 bit symbol, the 125 MBit per second FDDI transmission rate translates to a 100 MBit per second data rate.

To accommodate the maximum allowable ±50 PPM frequency variation between data terminals on an FDDI network, it is desirable that an elasticity buffer be utilized in each terminal. The recovered receive clock writes data into the elasticity buffer and the local transmit clock reads the data from the elasticity buffer in a sequential fashion for further transmission.

The design of a conventional elasticity buffer is very straightforward. Basically, an elasticity buffer is a cyclic buffer queue, that is, a series of sequentially accessed storage registers wherein access for a particular operation, i.e. write or read, returns or "wraps around" to the first register in the series after the last register in the series has been accessed for that operation. Write pointer logic, typically an incrementing counter, holds the address of the register currently accessed for a write operation. Similarly, read pointer logic holds the address of the register currently being accessed for a read operation. The elasticity buffer's write pointer starts writing received symbols into the storage registers of the elasticity buffer upon receiving a start delimiter symbol and stops writing symbols after an end delimiter symbol has been written. Similarly, the elasticity buffer's read pointer starts reading symbols from the storage registers upon receiving a read-start signal and stops reading symbols after reading an end delimiter symbol.

A major limitation of the conventional elasticity buffer design is its requirement that a time gap of at least one symbol or more exist between sequential data packets. That is, a conventional elasticity buffer cannot handle back-to-back data packets with no separation. Since there is no predetermined start area for the second and subsequent back-to-back data packets, both the write and the read pointer logic must "remember" their previous positions. Furthermore, a conventional elasticity buffer cannot function with a continuous stream of line state symbols which contains neither a start delimiter nor an end delimiter.

Thus, it would be highly desirable to have available an elasticity buffer design which provides for periodic resynchronization of its write and read pointers to permit timing drift between receiver and transmitter clocks.

It would also be desirable to have available an elasticity buffer design which adjusts the length of start-stop code patterns to maintain constant timing between data packets.

SUMMARY OF THE INVENTION

Accordingly, a preferred embodiment of a symbol-wide elasticity buffer in accordance with the present invention provides both for reframing, i.e. read/write pointer resynchronization, after each packet and for handling a continuous steam of line state symbols for a period longer than the allowed packet size without resulting in an overflow or underflow condition.

According to one aspect of the present invention, the elasticity buffer may be divided into two distinct sections, a START section and a CONTINUATION section. The buffer's write pointer will not enter the CONTINUATION section, which constitutes a cyclic queue, until the read pointer is directed to the first of the multiple, sequential registers included in the START section. The read pointer must then sequentially read each of the START section registers before entering the CONTINUATION section. Once the write pointer or the read pointer has left the START section, it can only reenter upon receipt of a START delimiter signal. When the write pointer or read pointer reaches the last register in the multiple register CONTINUATION section, it is automatically routed back to the first register in the CONTINUATION section.

According to a second aspect of the present invention, a repeat flag may be associated with the last register in the CONTINUATION section. The repeat flag is set upon receipt of a repeatable control signal by the write pointer at the last register in the CONTINUATION section. When the repeat flag is set, the read pointer reaches the final register in the CONTINUATION section and continues to read the same symbol without causing an overflow or underflow. When a different symbol is received, the repeat flag is cleared, a CONTINUE signal is generated and the write pointer begins writing to the CONTINUATION section. After a predetermined delay, the read pointer begins reading the first register in the CONTINUATION section.

Thus, the particular embodiment of an elasticity buffer design disclosed herein provides a number of advantages over conventional elasticity buffer designs. First, the length of the START register determines the maximum separation of the read pointer and the write pointer. Second, to handle back-to-back packets without separation, one more buffer space is added and the write pointer issues a start signal one symbol later. Third, since the write pointer doesn't need to know the position of the read pointer when starting a new packet, the write pointer control logic is greatly simplified.

Other features and advantages of the present invention will be understood and appreciated by reference to the detailed description of the invention provided below, which should be considered in conjunction with the accompanying drawings.

DETAILED DESCRIPTION OF THE INVENTION

According to the FDDI protocol described above, data packets, each of which consists of at most 9000 symbols, that are transmitted on an FDDI network must initially be separated by a minimum preamble of sixteen Idle symbols. However, the interaction of the elasticity buffers in cascaded repeating data terminals can cause this preamble to shrink to zero due to the plus or minus 50 PPM allowable clock error between terminals. Each receiver within the network reframes upon receipt of a START delimiter symbol pair.

The FDDI protocol defines sixteen data symbols and eight control symbols. The eight control symbols are as follows: J, K, Idle, Halt, Quiet, Ending Delimiter, Set and Reset. A line state is defined as a continuous stream of a control symbol. There are four different line states that can be written into a receiving terminal's elasticity buffer: Idle Line State (ILS); Quiet Line State (QLS); Halt Line State (HLS); and Master Line State (MLS), which is a continuous stream of alternating Halt and Quiet symbols.

The symbol set for the FDDI protocol is provided in the Appendix included at the end of this description of the invention. In the Appendix, the external symbol codes are defined by the FDDI standard. In accordance with a preferred embodiment of the invention, these codes are decoded to the internal symbol codes by a decoder of conventional design (e.g. a ROM lookup table). The internal codes are then written into the elasticity buffer.

Figure 1:
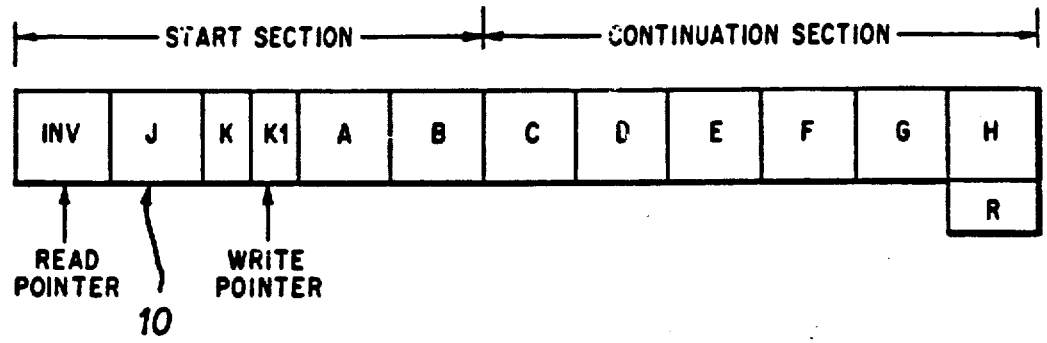
FIG. 1 is a block diagram illustrating the partitioning of an elasticity buffer into a START section and a CONTINUATION section in accordance with the present invention and the location of the elasticity buffer's read and write pointers upon power up or reset.
Figure 4:
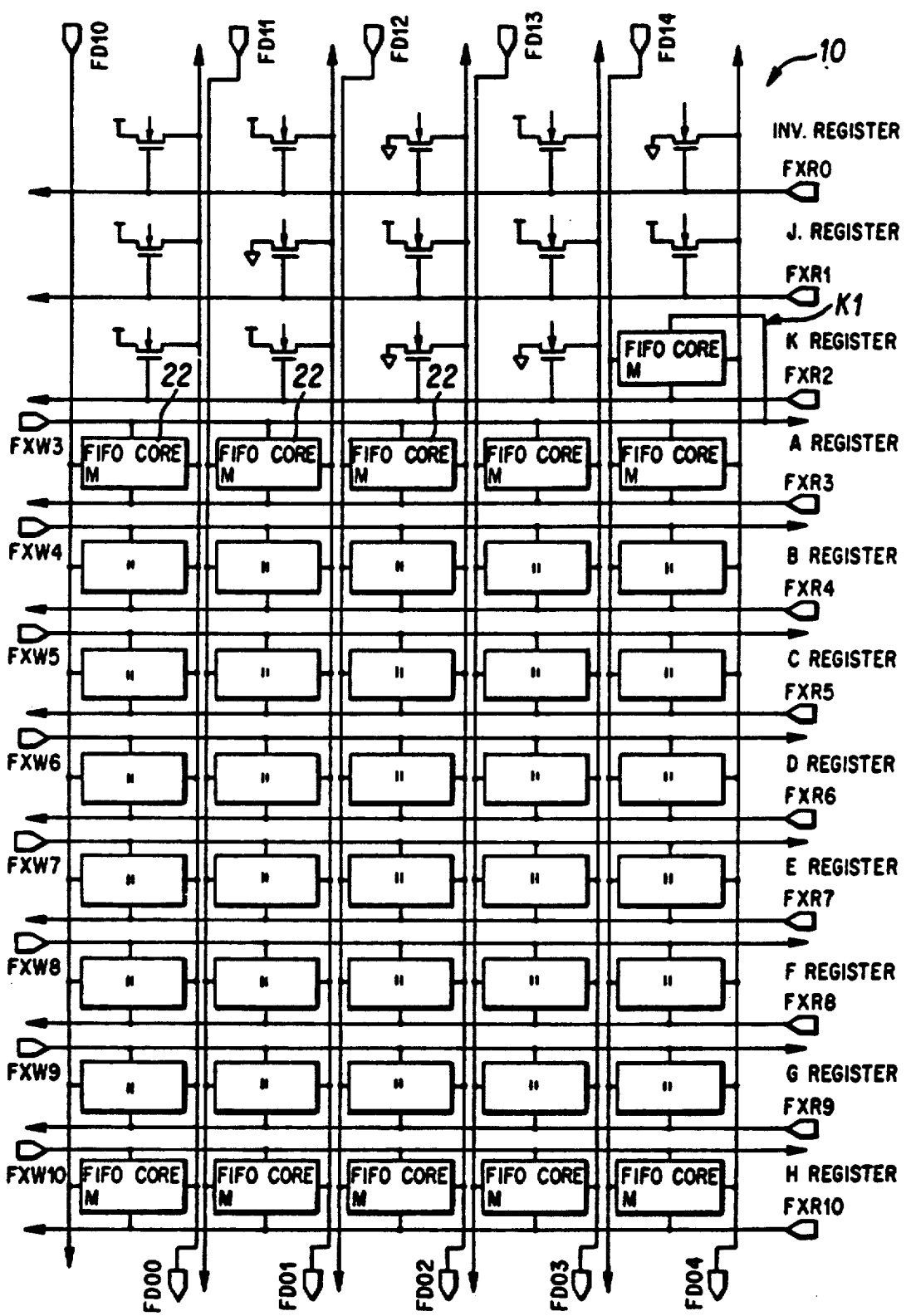
FIG. 4 is a schematic diagram illustrating a circuit design for a preferred embodiment of an elasticity buffer in accordance with the present invention.

FIG. 1 provides a schematic representation of an elasticity buffer 10 in accordance with the present invention. FIG. 4 provides a more detailed circuit diagram of elasticity buffer 10.

In accordance with one aspect of the present invention, elasticity buffer 10 is divided into a START section and a CONTINUATION section. The START section contains five registers; INV, J, K/K1, A and B. Each of the START section registers is five bits wide, that is, the width of one internal symbol code. The INV register contains a read-only invalid symbol. The J register contains a read-only J symbol. The K register contains read-only first four bits of the K symbol; K1 contains the remaining writable bit of the K symbol. The A and B registers are read-write registers.

The C, D, E, F, G and H registers constitute the CONTINUATION section, i.e. the actual cyclic queue portion, of the elasticity buffer 10. In accordance with a second aspect of the present invention, and as discussed in greater detail below, a Repeat Flag (R) is associated with the final (H) register in the CONTINUATION section.

Upon power up of the data terminal of which the elasticity buffer 10 is a part, the write pointer of elasticity buffer 10 is cleared and its read pointer is set to the START section's INV register which, as stated above, contains an invalid symbol. Thus, continuous invalid symbols are generated, indicating that the terminal is not receiving data. As will be explained in greater detail below, the only way to exit this mode is by asserting either a START or CONTINUE signal from the terminal's receiver state machine, which resides in front of the elasticity buffer 10.

When the receiver state machine decodes a START delimiter, i.e. a JK symbol pair, followed by a data symbol, a START pulse is generated. As shown in FIG. 1, this causes the write pointer to simultaneously write to the K1 bit of the K register and to the A register. By allowing a write to the last bit (K1) of the K register, a START delimiter for a data packet is easily distinguished from that for circuit-switched data as defined in the proposed Hybrid Ring Control extension to the FDDI standard.

Since the write pointer of elasticity buffer 10 is synchronized to a receive clock that is recovered from the received data signal, while its read pointer is synchronized to its own local clock, typically a crystal oscillator, the START signal must be resynchronized to the local clock within an acceptable probability that metastability will be avoided.

Figure 2:
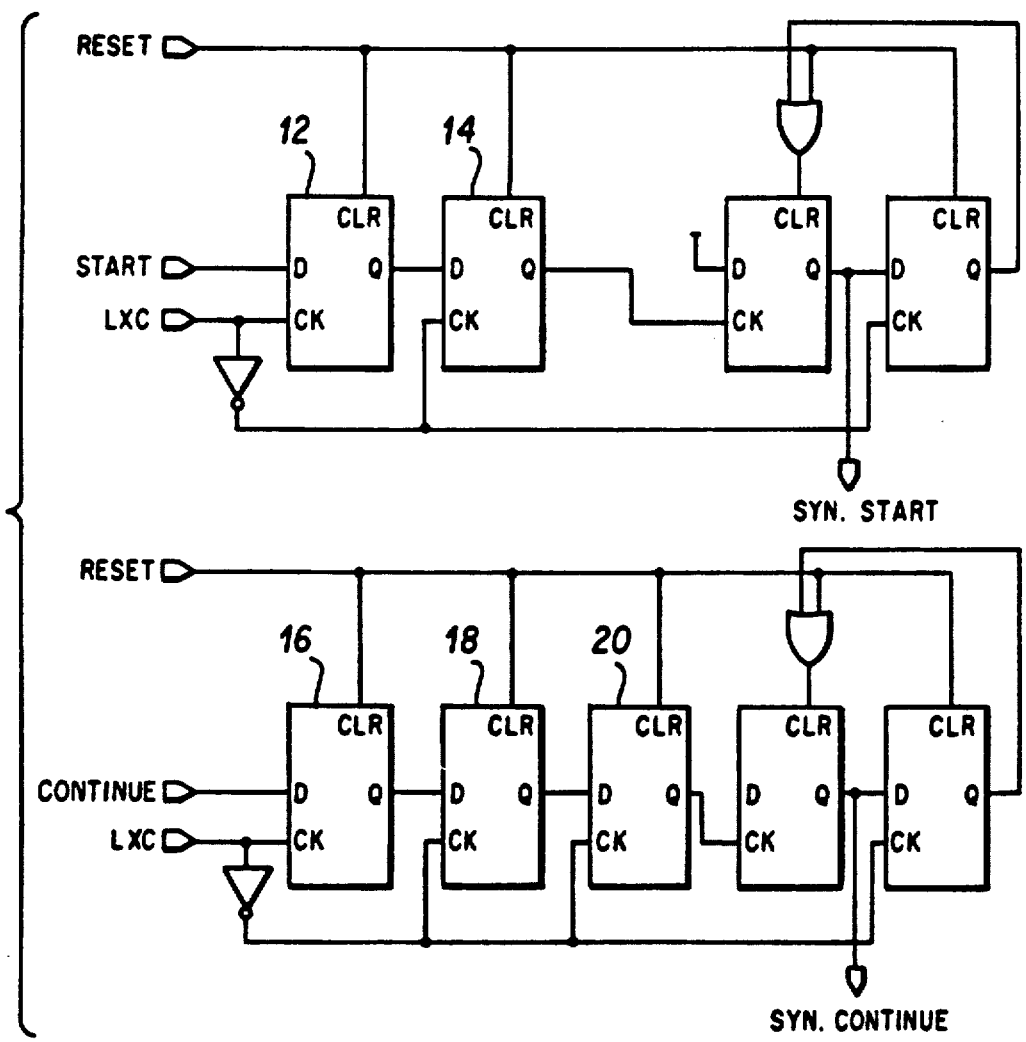
FIG. 2 is a schematic diagram illustrating a circuit design for synchronizing the write pointer and the read pointer of an elasticity buffer in accordance with the present invention.

As shown in FIG. 2, two master/slave D latches 12 and 14 are used for this purpose. This results in the creation of a subsequent uncertainty window for the occurrence of a synchronized START signal SYN.-START of between one-half ($\frac{1}{2}$) and one and one-half (1$\frac{1}{2}$) symbol delays after the START signal. The read pointer can be as early as two and one-half (2$\frac{1}{2}$) symbols after the write pointer or as late as three and one-half (3$\frac{1}{2}$) symbols behind the write pointer due to the built-in read only JK separation.

Since, during reframing, the write pointer has no knowledge of the read pointer's location, the addition of the B register in the START section ensures that the write pointer will not leave the START section until the SYN.START signal has been asserted, causing the read pointer to point to the J register. The read pointer must then sequentially read the registers of the START section before it can enter the CONTINUATION section cyclic buffer queue.

Once the write pointer or the read pointer leaves the START section, it can only reenter the START section upon receipt of a JK start delimiter symbol pair.

When the write pointer or the read pointer reaches the last register in the CONTINUATION section, i.e. the H register in FIGS. 1 and 4, it is then automatically routed back to the first register in the CONTINUATION section, i.e. the C register, forming a cyclic buffer queue.

Upon receiving any repeatable control symbols, the receiver state machine sets the R-Flag signal in the H register only if the write pointer is writing this particular register. Once the R-Flag has been set, any new symbol will output a CONTINUE signal which forces the write pointer to the C register.

Similarly, as further shown in FIG. 2, the generation of a resynchronized CONTINUE signal SYN.CONTINUE relies on three master/slave D latches 16, 18, 20 to guarantee a minimum separation of two and one-half (2$\frac{1}{2}$) symbols from the write pointer. After writing the H register, if the R-Flag is set, the write pointer is cleared. Thus, the read pointer will reach the H register and continue to read the same symbol without causing an overflow or underflow condition. When a non-repeatable or different repeatable symbol is received, a CONTINUE signal is generated, allowing the write pointer to start writing the C register. After a minimum two and one-half (2$\frac{1}{2}$) symbol delay, a resynchronized CONTINUE signal SYN.CONTINUE starts the read pointer at the C register.

Figure 3A:
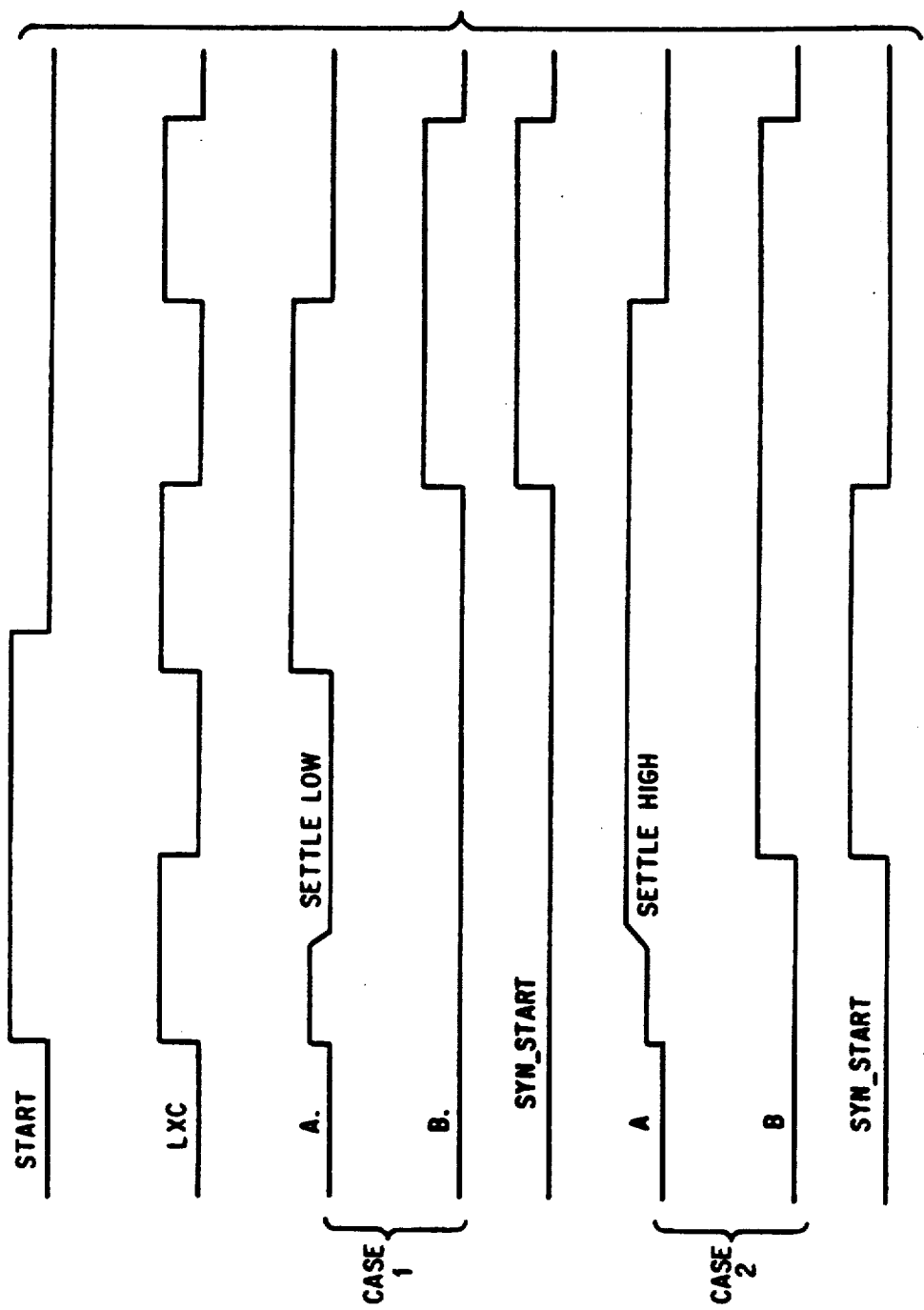
FIG. 3A provides a timing diagram illustrating uncertainty in synchronizing an elasticity buffer's write pointer and read pointer due to metastability.
Figure 3B:
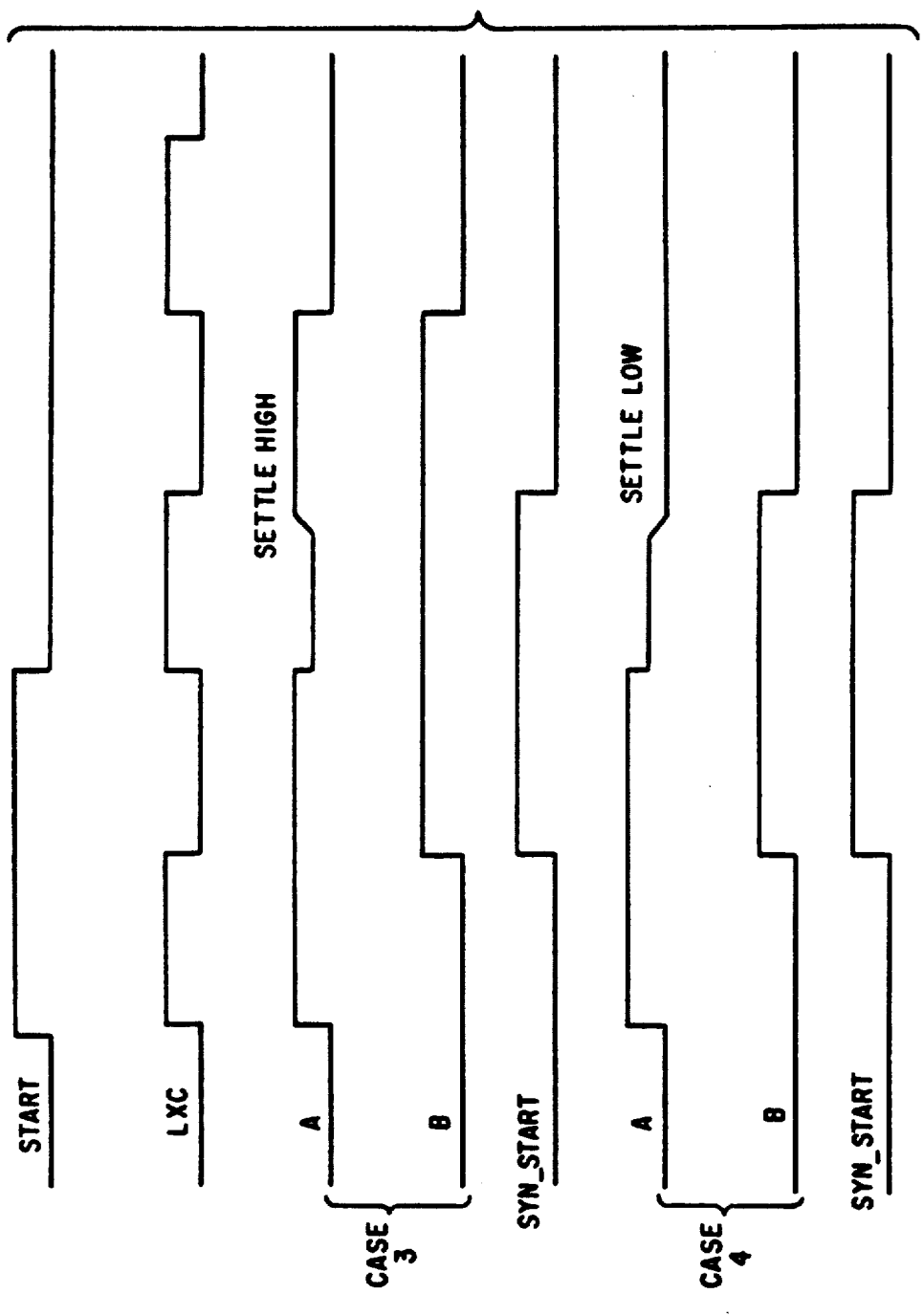
FIG. 3B provides a timing diagram illustrating a metastable problem of an elasticity buffer's write pointer and read pointer at the falling edge.
Figure 3C:
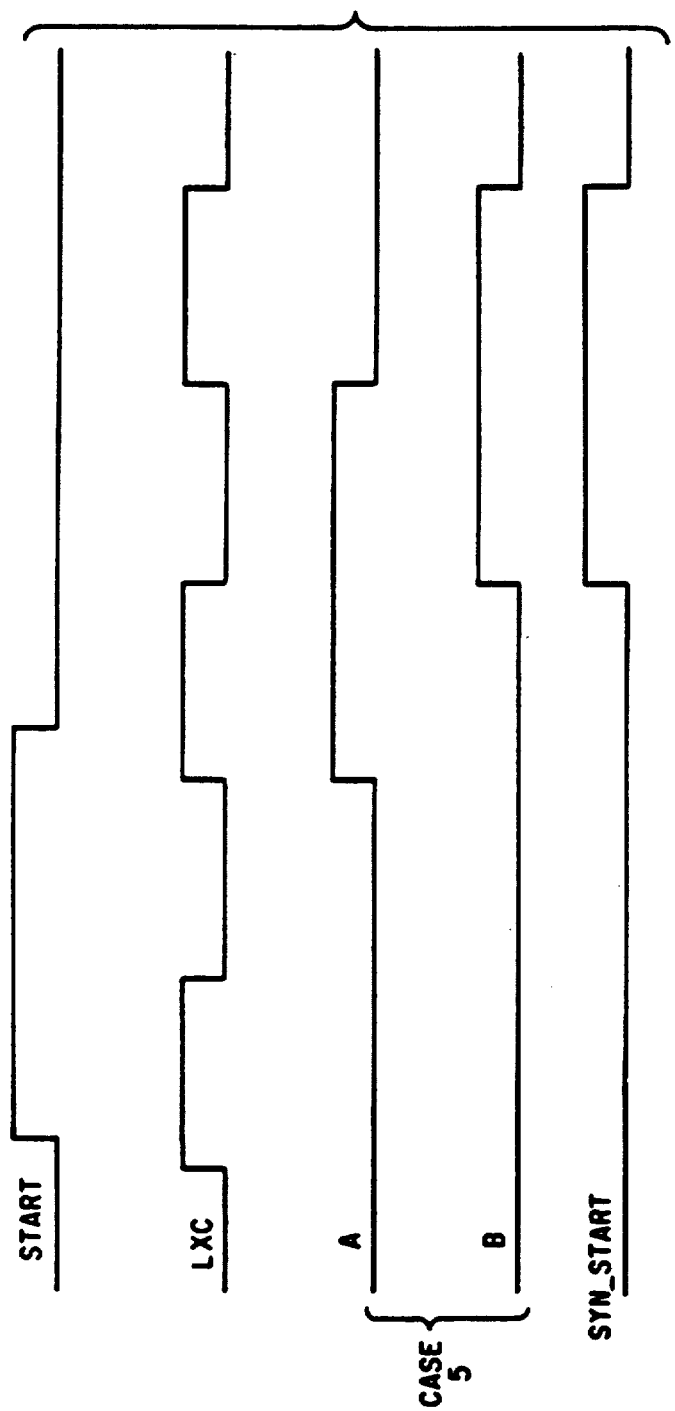
FIG. 3C is a timing diagram illustrating the case of no metastable problems for an elasticity buffer's write pointer and read pointer.

Detailed timing diagrams, describing three metastable conditions at both edges of a START signal, are provided in FIGS. 3A-3C. These Figures also describe SYN.CONTINUE timing by replacing the START signal with the CONTINUE signal.

FIG. 3A shows a metastable condition at the leading edge of a START signal. Case 1 illustrates flip-flop 12 (see FIG. 2) entering the metastable state and settling to logic "0" within one-half symbol time. In this case, the SYN-START signal is delayed by one and one-half (1$\frac{1}{2}$) symbols. Similarly, Case 2 illustrates a metastable state which settles to a logic "1". In this case, the SYN-START signal is only delayed by one-half ($\frac{1}{2}$) symbol.

FIG. 3B shows a falling edge metastable condition. In both Case 3 (flip-flop 12 settles high) and Case 4 (flip-flop 12 settles low), the same SYN-START waveform is generated.

FIG. 3C shows a timing waveform for the read pointer control logic where a metastable condition does not occur.

The delay to the SYN-START signal with respect to the START signal in both the FIG. 3B and FIG. 3C cases lies between $\frac{1}{2}$ and 1$\frac{1}{2}$ symbols.

As stated above, FIG. 4 provides a circuit implementation of an elasticity buffer 10 in accordance with the present invention. As shown in FIG. 4, the read-only INV, J and K registers are hardwired logic "1"s and "0"s, consistent with Table I above. The core of the buffer consists of a plurality of nested blocks 22 for any readable and writable bit.

Figure 5:
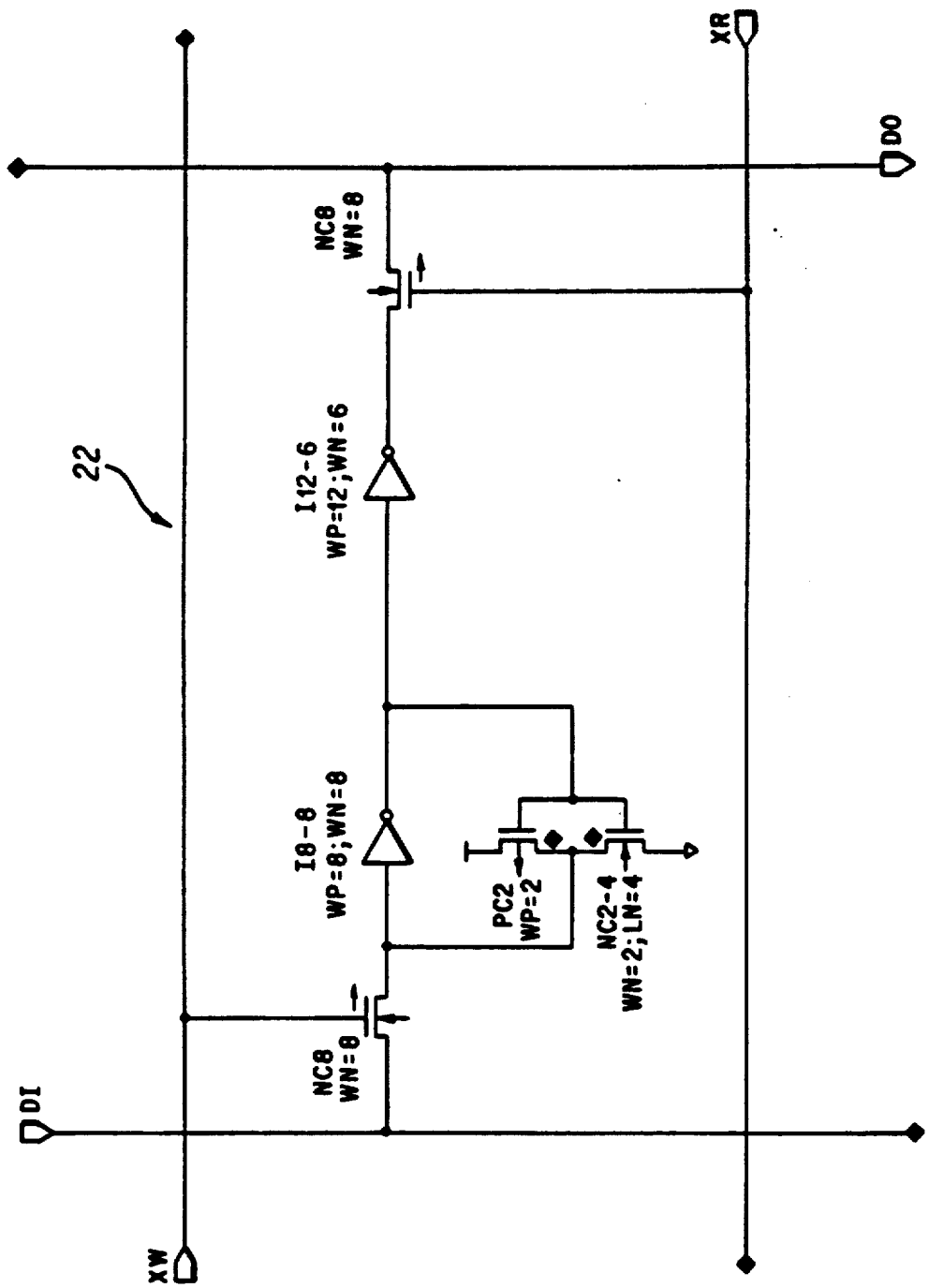
FIG. 5 is a schematic diagram illustrating a typical nested block of the elasticity buffer core shown, in FIG. 4 for any readable and writable bit.

The detailed circuitry for a typical nested block 22 is illustrated in FIG. 5, wherein line DI is the data input signal and line DO is the data output signal. The XW signal, when asserted, allows data to be written in. The XR signal, when asserted, allows data to be read out.

Figure 6:
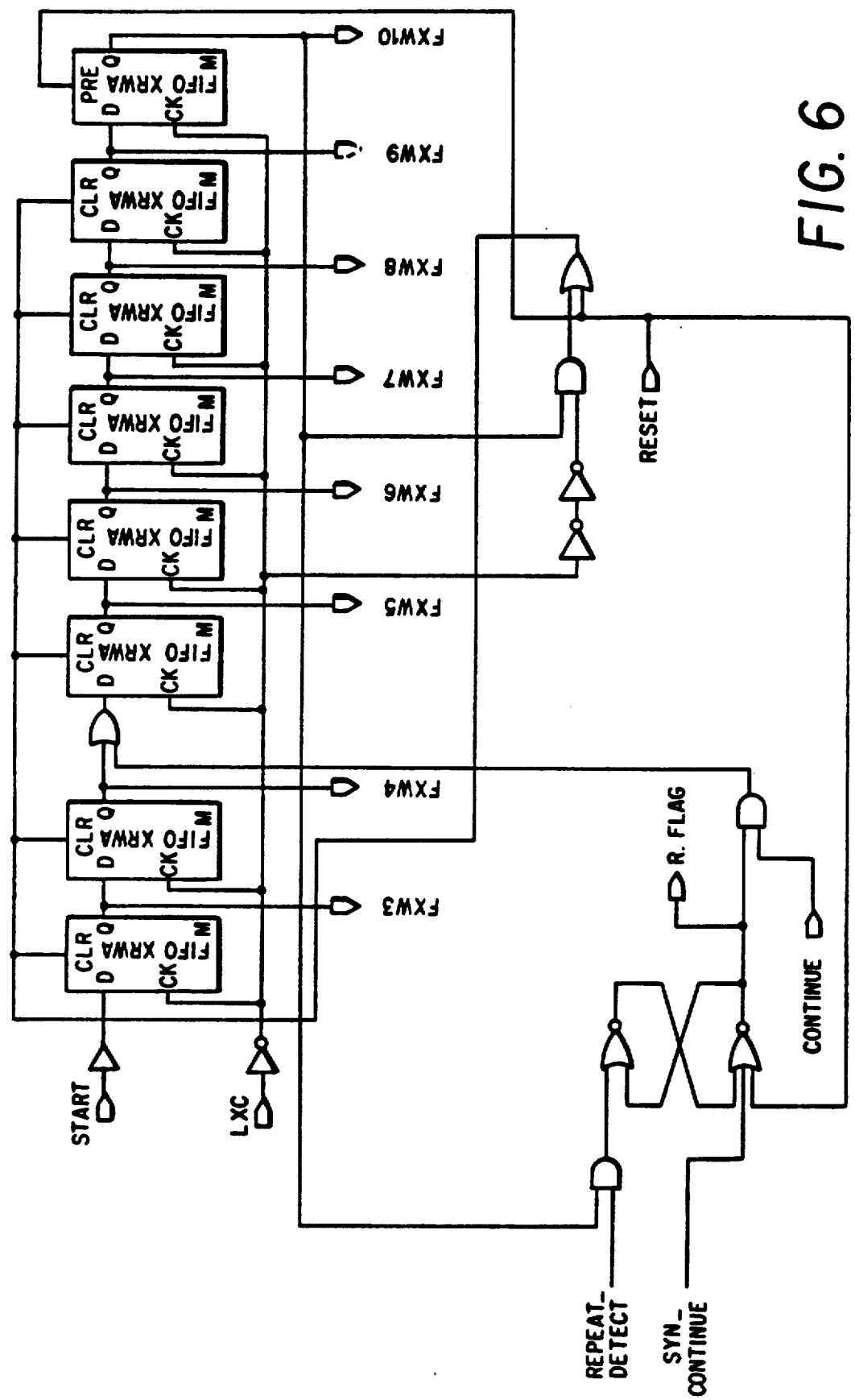
FIG. 6 is a schematic diagram illustrating a circuit design for write pointer control logic for the elasticity buffer shown in FIG. 4.

FIG. 6 illustrates a design for write pointer control logic which can be used in conjunction with the buffer core shown in FIG. 4. A RESET signal clears the first seven D flip-flops and the R-Flag output of the write pointer control logic, but sets the last flip-flop to logic "1". As stated above, upon receiving a JK start delimiter symbol, the receiver state machine generates a START pulse, generated by the leading edge of SXC, which is clocked into the FXW3 flip-flop at the falling edge of the symbol clock SXC. This asserts the FXW3 signal which, as shown in FIG. 4, writes both the last bit (K1) of the K register and the contents of the A register. During the subsequent clock periods, data are written into the elasticity buffer 10 as the enabling control bit shifts sequentially from the FXW3 flip-flop to the FXW10 flip-flop (H register), the output of the FXW10 flip-flop being fed back to the FXW5 flip-flop (C register) through an AND gate, forming cyclic queue control for the CONTINUATION section. When R-Flag has been set and CONTINUE has not been set, the write pointer is cleared.

As further shown in FIG. 6, when the receiver state machine decodes any repeatable symbols, the REPEAT.DETECT signal is asserted, causing the R-Flag to be asserted as stated above and the cyclic queue is disabled. Since the repeatable symbol is written into the H register setting the R-Flag, the write pointer is cleared at the next clock transition. When a new symbol is detected, the receiver state machine enables the control of the first register in the CONTINUATION section and the cyclic queue configuration is again restored. This design provides a self reset feature which clears all previous shift registers in the write pointer control logic after the assertion of the FXW10 signal.

Figure 7:
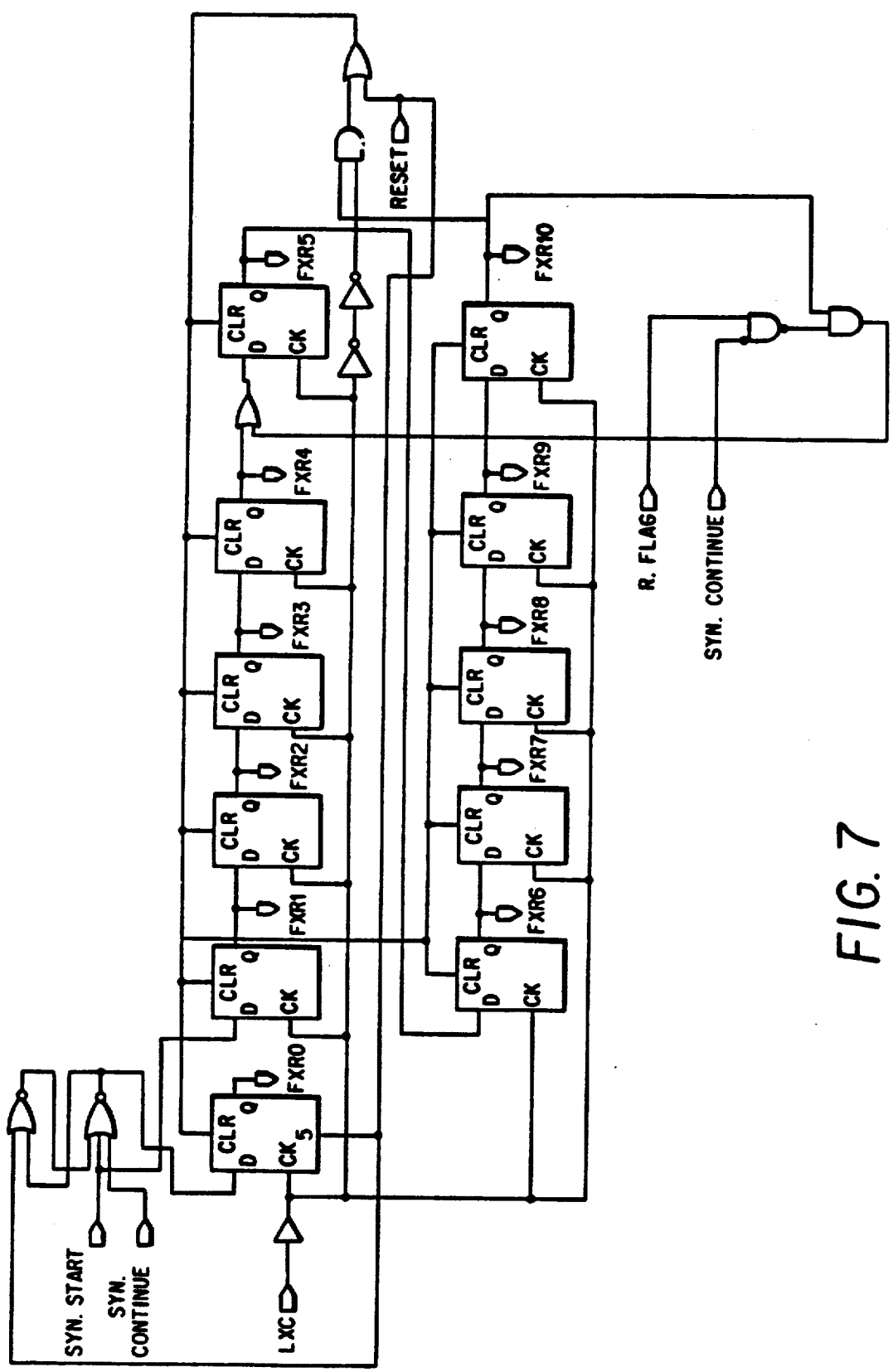
FIG. 7 is a schematic diagram illustrating a circuit design for the read pointer control logic of the elasticity buffer shown in FIG. 4.

A read pointer control circuit which can be used in conjunction with the elasticity buffer 10 is shown in FIG. 7. During reset, only the FXR0 flip-flop is set and all others are cleared. In this state, the read pointer is continuously reading INV symbols. Upon assertion of either a SYN-START signal or a SYN-CONTINUE signal, the FXR0 signal is de-asserted at the first rising edge of the local clock LXC. If an incoming signal is SYN-START, then the FIFO FXR1 is set at the same rising edge. Thus, the J symbol is read. This read control signal is then shifted sequentially down to the FXR10 flip-flop. If the R-flag has been set, the read pointer continuously reads the H register until the SYN-CONTINUE signal is issued and it clears the R-Flag. If the R-Flag has not been set, the output of FXR10 flip-flop is fed into the input of FXR5 flip-flop, forming read pointer cyclic queue control. If an incoming signal is SYN-CONTINUE after a reset, the FXR5 flip-flop is set and the START section of the buffer is bypassed. This design also offers a self-reset feature which clears all previous shift registers in the read pointer control logic following the assertion of FXR10.

It should be understood that various alternatives to the embodiments of the invention described herein may be employed in practicing the invention. It is intended that the following claims define the scope of the invention and that circuit structures within the scope of these claims and their equivalents be covered thereby.

APPENDIX
© National Semiconductor Corporation 19__
SYMBOL SETS

| EXTERNAL SYMBOLS | | INTERNAL SYMBOLS | | |
|---|---|---|---|---|
| CODE | SYMBOL | SYMBOL | CODE | USAGE |
| 11110 | 0 | 0 | 00000 | Data Quartet (SD, CD, AFR/ACY) |
| 01001 | 1 | 1 | 00001 | Data Quartet (SD, CD, AFR/ACY) |
| 10100 | 2 | 2 | 00010 | Data Quartet (SD, CD, AFR/ACY) |
| 10101 | 3 | 3 | 00011 | Data Quartet (SD, CD, AFR/ACY) |
| 01010 | 4 | 4 | 00100 | Data Quartet (SD, CD, AFR/ACY) |
| 01011 | 5 | 5 | 00101 | Data Quartet (SD, CD, AFR/ACY) |
| 01110 | 6 | 6 | 00110 | Data Quartet (SD, CD, AFR/ACY) |
| 01111 | 7 | 7 | 00111 | Data Quartet (SD, CD, AFR/ACY) |
| 10010 | 8 | 8 | 01000 | Data Quartet (SD, CD, AFR/ACY) |
| 10011 | 9 | 9 | 01001 | Data Quartet (SD, CD, AFR/ACY) |
| 10110 | A | A | 01010 | Data Quartet (SD, CD, AFR/ACY) |
| 10111 | B | B | 01011 | Data Quartet (SD, CD, AFR/ACY) |
| 11010 | C | C | 01100 | Data Quartet (SD, CD, AFR/ACY) |
| 11011 | D | D | 01101 | Data Quartet (SD, CD, AFR/ACY) |
| 11100 | E | E | 01110 | Data Quartet (SD, CD, AFR/ACY) |
| 11101 | F | F | 01111 | Data Quartet (SD, CD, AFR/ACY) |
| 00111 | R | R | 10000 | Reset Quartet (SD, CD, AFR/ACY) |
| 11001 | S | S | 10001 | Set Indicator (SD, CD, AFR/ACY) |
| 01101 | T | T | 10010 | Terminate Indicator (SD, CD, AFR/ACY) |
| 11111 | I | I | 10011 | Idle (SD, D, AFR/ACY) |
| 00101 | L | ICD | 10100 | In-Cycle Delimiter (SD, CD, ACY, IL pair) |
|  | Any | LSU | 10101 | Line State Unknown (SD, CD, V) |
| 11111 | I | ILS | 10110 | Idle Line State (SD, CD) |
| 11000 | J | ALS | 10111 | Active Line State (SD, CD, JK pair) |
| 10001 | K | AFR | 11001 | Active Frame (SD, CD, JK, I/n next) |
| 10001 | K | ACY | 11000 | Active Cycle (SD, CD, JK, R/S/T next) |
|  | Any | INV | 11010 | Invalid (SD, LSU, PH__ Invalid, V) |
|  | Any | NLS | 11011 | Noise Line State (SD, PH__ Invalid, V) |
|  | H,Q | MLS | 11100 | Master Line State (SD, PH__ Invalid, V) |
| 00100 | H | HLS | 11101 | Halt Line State (SD, PH__ Invalid, V) |
| 00000 | Q | QLS | 11110 | Quiet Line State (SD, PH__ Invalid, V) |
|  | Any | NSD | 11111 | No Signal Detect (QLS, PH__ Invalid, V) |

What is claimed is:

1. An elasticity buffer utilizable in a data terminal for synchronizing the writing of received symbols to elasticity buffer storage in accordance with the cycles of a receive clock signal recovered from an input signal to the data terminal, the input signal including the received symbols, and the reading from elasticity buffer storage of stored received symbols for retransmission by the data terminal in accordance with the cycles of a local clock signal generated at the data terminal, the elasticity buffer comprising:

(a) an elasticity buffer core comprising a first section comprising a first plurality of sequentially-arranged storage elements for storing symbols and a second section comprising a second plurality of sequentially-arranged storage elements for storing symbols:

(b) write pointer means responsive to a predetermined write signal provided at a write initiate cycle of the receive clock signal for initiating the sequential writing of symbols to the elasticity buffer core beginning with a first preselected storage element of the first section and continuing sequentially first through storage elements of the first section subsequent to the first preselected storage element and then through the sequentially-arranged storage elements of the second section; and (c) read pointer means responsive to a predetermined read signal provided at a read initiate cycle of the local clock signal, the read initiate cycle being subsequent to the write initiate cycle, for initiating the reading of symbols from the elasticity buffer core beginning with a second preselected storage element prior to the first preselected storage element in the sequence of storage elements comprising the first section and continuing sequentially first through storage elements of the first section subsequent to the second preselected storage element and then through the sequentially-arranged storage elements of the second section.

2. An elasticity buffer as in claim 1 and further comprising means for controlling the write pointer means such that the write pointer means begins writing symbols to the storage elements of the second section only after the predetermined read signal has been received by the read pointer means.

3. An elasticity buffer as in claim 2 and further comprising means for directing the write pointer means to the first storage element in the second section after a symbol has been written to the last storage element in the second section.

4. An elasticity buffer as in claim 3 and further comprising means for directing the read pointer means to the first storage element in the second section after a symbol has been read from the last storage element in the second section.

5. An elasticity buffer as in claim 4 and further comprising means for directing the write pointer means from writing symbols to the second section to writing symbols to the first section only upon receipt by the write pointer means of the predetermined write signal.

6. An elasticity buffer as in claim 5 and further comprising means for directing the read pointer means from reading symbols from the second section to reading symbols from the first section only upon receipt of the predetermined write signal.

7. An elasticity buffer as in claim 6 and further comprising means responsive to a repeatable control signal for setting a repeat flag such that the read pointer means continues reading the symbol from the last storage element in the second section.

8. An elasticity buffer as in claim 7 wherein the means for setting a repeat flag is responsive to a signal other than the repeatable control signal for clearing the repeat flag such that the write pointer means begins sequential writing of symbols to the second section.

9. An elasticity buffer as in claim 8 wherein the read pointer means is responsive to the clearing of the repeat flag such that, after a predetermined delay, the read pointer means begins sequential reading of symbols from the second section.

10. An elasticity buffer for use in a data terminal of a data communications system and of the type that includes a write pointer synchronized to a receive clock recovered from an input signal to the data terminal for writing data included in the input signal into the elasticity buffer and a read pointer synchronized to a local clock generated at the data terminal for reading data from the elasticity buffer, the elasticity buffer comprising:

a plurality of sequential registers which define a START section which includes a plurality of read-only registers followed by a plurality of read-write registers and a CONTINUATION section which follows the START section and includes plurality of read-write registers;

means for synchronizing a predetermined signal to the local clock;

means responsive to a power up signal for directing the read pointer to the first read-only register in the START section;

means responsive to the synchronized predetermined signal for initiating the write pointer at the first read-write register in the START section for sequential movement through the elasticity buffer registers in accordance with cycles of the receive clock signal and for simultaneously initiating sequential movement of the read pointer through the elasticity buffer registers in accordance with cycles of the local clock signal such that when the write pointer and the read pointer reaches the last register in the CONTINUATION it is routed back to the first register in the CONTINUATION section, forming a cyclic buffer queue.

11. An elasticity buffer as in claim 10 and further including means for preventing direction of the write pointer or the read pointer to the START section except upon assertion of a start delimiter signal.

12. An elasticity buffer as in claim 10 and wherein the last register in the CONTINUATION section includes means for freezing the write pointer and the read pointer to allow reading of a continuous stream of line state symbols without causing either overflow or underflow.

13. A method of synchronizing the writing of received symbols to storage in an elasticity buffer utilizable in a data terminal in accordance with the cycles of a receive clock signal recovered from an input signal to the data terminal, the input signal including the received symbols, and the reading from elasticity buffer storage of stored received symbols for retransmission by the data terminal in accordance with the cycles of a local clock signal generated at the data terminal, wherein the elasticity buffer comprises an elasticity buffer core comprising a first section that includes a first plurality of sequentially-arranged storage elements for storing symbols and a second section comprising a second plurality of sequentially-arranged storage elements for storing symbols, the method comprising:

(a) in response to a predetermined write signal provided at a write initiate cycle of the receive clock signal, initiating the sequential writing of symbols to the elasticity buffer core beginning with a first preselected storage element of the first section and continuing sequentially first through storage elements of the first section subsequent to the first preselected storage element and then through the sequentially-arranged storage elements of the second section; and (b) in response to a predetermined read signal provided at a read initiate cycle of the local signal, the read initiate cycle being subsequent to the write initiate cycle, initiating the reading of symbols from the elasticity buffer core beginning with a second preselected storage element prior to the first preselected storage element in the sequence of storage elements comprising the first section and continuing sequentially first through storage elements of the first sections subsequent to the second preselected storage element and then through the sequentially-arranged storage elements of the second section.

14. A method as in claim 13 and including writing symbols to the storage elements of the second section only after the predetermined read signal has been received.

15. A method as in claim 14 and including routing the writing of symbols to the first storage element in the second section after a symbol has been written to the last storage element in the second section.

16. A method as in claim 15 and including routing the reading of symbols to the first storage element in the second section after a symbol has been read from the last storage element in the second section.

17. A method as in claim 16 and including routing the writing of symbols to the second section to writing symbols to the first section upon receipt of the predetermined write signal.

18. A method as in claim 17 and including routing the reading of symbols from the second section to reading symbols from the first section upon receipt of the predetermined read signal.

19. A method as in claim 18 and including, in response to receipt of a repeatable control signal, setting a repeat flag such that the symbol stored in the last storage element in the second section is continuously read.

20. A method as in claim 19 and including, in response to a signal other than the repeatable control signal, clearing the repeat flag such that symbols are sequentially written to the second section.

21. A method as in claim 20 and including, in response to the clearing of the repeat flag, and after a predetermined delay, sequentially reading symbols from the second section.

* * * * *